US008068863B2

(12) United States Patent
Song

(10) Patent No.: US 8,068,863 B2

(45) Date of Patent: Nov. 29, 2011

(54) MESSAGE TRANSMISSION METHOD FOR A MOBILE COMMUNICATION TERMINAL

(75) Inventor: Myeong Seok Song, Seoul (KR)

(73) Assignee: Samsung Electronics Co., Ltd., Maetan-dong, Yeongtong-gu, Suwon-si, Gyeonggi-do (KR)

(*) Notice: Subject to any disclaimer, the term of this patent is extended or adjusted under 35 U.S.C. 154(b) by 1093 days.

(21) Appl. No.: 11/903,181

(22) Filed: Sep. 20, 2007

(65) Prior Publication Data

US 2008/0125150 A1 May 29, 2008

(30) Foreign Application Priority Data

Nov. 23, 2006 (KR) ............................ 2006-0116191

(51) Int. Cl.
*H04W 4/00* (2009.01)

(52) U.S. Cl. ....................................... 455/466; 455/518

(58) Field of Classification Search .................. 455/466
See application file for complete search history.

(56) References Cited

U.S. PATENT DOCUMENTS

| | | | | |
|---|---|---|---|---|
| 5,222,157 | A * | 6/1993 | Yoneda et al. | 382/306 |
| 7,292,870 | B2 * | 11/2007 | Heredia et al. | 455/466 |
| 7,293,006 | B2 * | 11/2007 | Beckius et al. | 1/1 |
| 2007/0283044 | A1 * | 12/2007 | Van Belle et al. | 709/245 |

FOREIGN PATENT DOCUMENTS

| | | |
|---|---|---|
| KR | 2004-61725 | 7/2004 |
| KR | 2005-28535 | 3/2005 |
| KR | 2005-67293 | 7/2005 |
| KR | 2005-81599 | 8/2005 |

* cited by examiner

*Primary Examiner* — Olumide T Ajibade Akonai

(74) *Attorney, Agent, or Firm* — Cha & Reiter, LLC

(57) ABSTRACT

A message transmission method for a mobile communication terminal is includes the steps of: inputting a message including a plurality of unit messages; matching a unit message to a receiver address; and transmitting the matched unit message to a mobile communication terminal having the particular receiver address identified by an identification symbol. The method may transmit a message pre-stored in a mobile communication terminal. The method reduces the time required for group transmission because the mobile communication terminal transmits different messages individually to a plurality of receivers by using unit messages newly input or pre-stored in the mobile communication terminal.

14 Claims, 5 Drawing Sheets

MESSAGE TRANSMISSION METHOD FOR A MOBILE COMMUNICATION TERMINAL

CLAIM OF PRIORITY

This application claims priority from an application entitled "MESSAGE TRANSMISSION METHOD FOR MOBILE COMMUNICATION TERMINAL" filed in the Korean Intellectual Property Office on Nov. 23, 2006 and assigned Serial No. 2006-0116191, the contents of which are incorporated herein by reference.

BACKGROUND OF THE INVENTION

1. Field of the Invention

The present invention relates to a message transmission method for a mobile communication terminal. More particularly, the present invention relates to a message transmission method for a mobile communication terminal enabling transmission of different messages individually to a plurality of receivers by using unit messages.

2. Description of the Related Art

With developments in mobile communication technology, the capabilities of mobile communication terminals include the ability to provide voice communications with few restrictions regarding time and location. In addition to voice communications, various functions, such as character information service, image information service, MP3, and games have been added to capabilities of many mobile communication terminals, and a user may freely select a desired function.

As the popularity of mobile communication terminals has increased, so has the popularity of using a short message service (SMS) to transmit a message to a receiver, regardless of an operating status of a receiving mobile communication terminal. SMS is also popular because it is a wireless call service enabling transmission of a user-created message to another party at a low cost.

In addition, (MMS) a multimedia messaging service has become an increasing popular method to transmit and receive various types of data, such as voice, music, still image, and moving pictures.

The methods for message transmission may be divided into a single transmission and a group transmission. The single transmission method is typically used for transmitting a message to a receiver. The group transmission method is typically used for transmitting a message to a plurality of receivers simultaneously.

However, one drawback of the conventional group transmission method is that an identical message is transmitted to a plurality of receivers. Therefore, the conventional group transmission method is not suitable for transmitting different messages individually to a plurality of receivers.

Moreover, when there is a need to transmit different messages individually to a plurality of receivers, the single message transmission method must be used repeatedly to transmit different messages individually to a plurality of receivers. Accordingly, the user is often inconvenienced by having to prepare and transmit each different message repeatedly to the plurality of receivers. Additionally, more time is required to transmit the messages.

SUMMARY OF THE INVENTION

The present invention provides a method for transmitting messages that includes a solution to at least the above-mentioned shortcomings of conventional group transmission and single transmission methods. At least one of the many objects of the present invention is to provide a method for transmitting different messages individually to a plurality of receivers by using unit messages.

Another object of the present invention is to reduce the time required for transmitting different messages individually to a plurality of receivers when compared with conventional methods of transmission.

In order to achieve the above objects, a message transmission method for a mobile communication terminal according to an exemplary embodiment of the present invention includes the steps of: inputting a message including a plurality of unit messages; matching a unit message to a receiver address; and transmitting the matched unit message to a mobile communication terminal having the receiver address.

According to another exemplary embodiment of the present invention, a message transmission method for a mobile communication terminal includes the steps of: displaying a message input window according to selection of a message transmission menu option; inputting, in the message input window, a message including a plurality of unit messages, each unit message having a different identification symbol; displaying, when the message input is complete, a receiver address input window; inputting, in the receiver address input window, a plurality of receiver addresses and a plurality of identification symbols corresponding to the unit messages to be transmitted to mobile communications terminals individually having a corresponding receiver address; and transmitting the unit messages to the mobile communication terminals.

According to yet another exemplary embodiment of the present invention, a message transmission method for a mobile communication terminal includes the steps of: displaying a message input window according to selection of a message transmission menu option; inputting, in the message input window, a message including a plurality of unit messages, each unit message having a different identification symbol; and transmitting the input unit messages individually to mobile communication terminals having corresponding receiver addresses.

BRIEF DESCRIPTION OF THE DRAWINGS

The above and other objects, features and advantages of the present invention will become more apparent from the following detailed description in conjunction with the accompanying drawings, in which.

DETAILED DESCRIPTION OF THE INVENTION

Hereinafter, exemplary embodiments of the present invention are described in detail with reference to the accompanying drawings. The same reference numbers are used throughout the drawings to refer to the same or like parts. Detailed descriptions of constructions or processes known in the art may be omitted to avoid obscuring the subject matter of the present invention.

A 'transmitter' means a user of a mobile communication terminal for transmitting a message and a 'receiver' means a user of a mobile communication terminal who receives the message. A 'transmitting terminal' means the mobile communication terminal used by the transmitter and a 'receiving terminal' means the mobile communication terminal used by the receiver.

Figure 1:
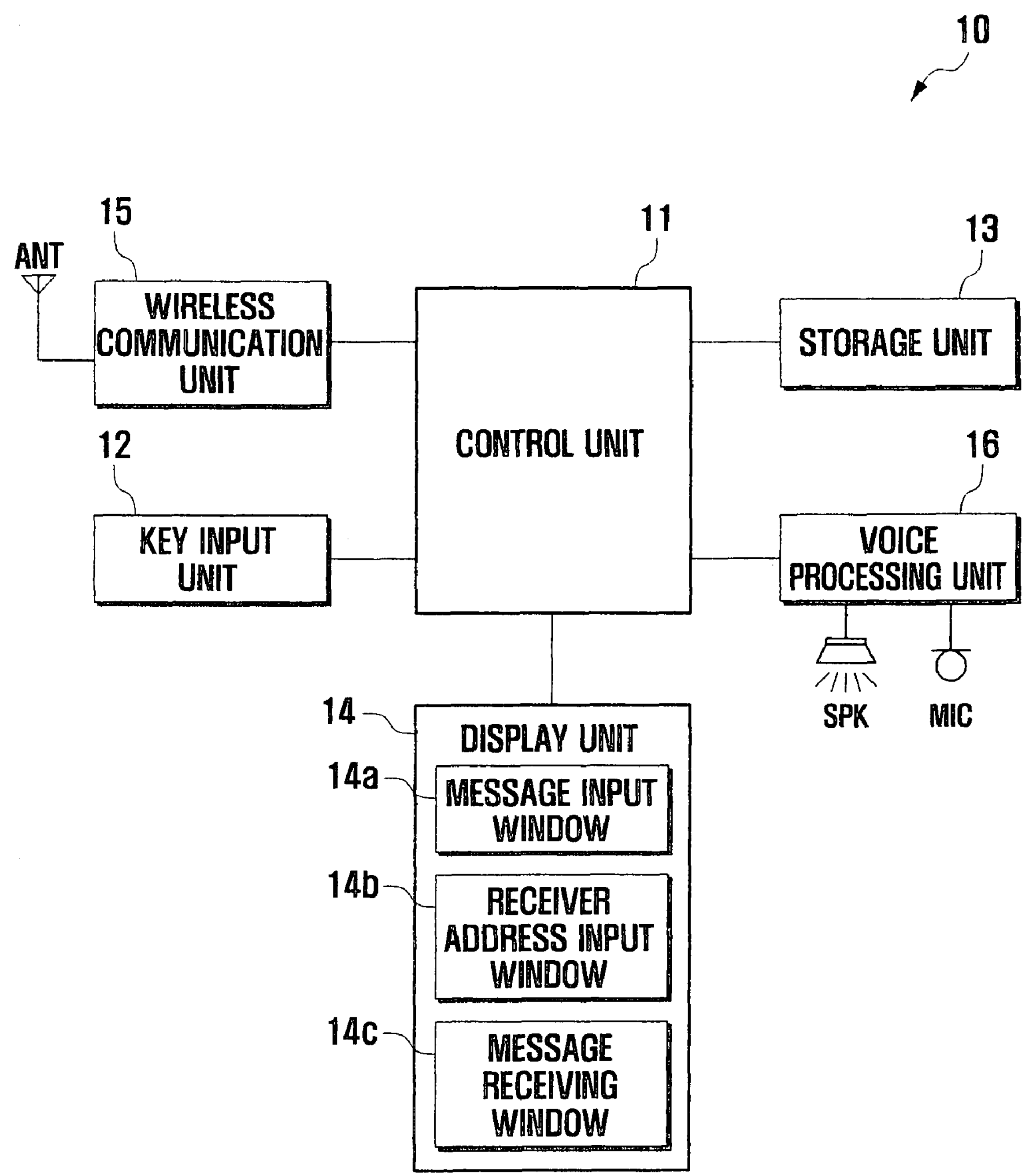
FIG. 1 is a block diagram showing a configuration of a mobile communication terminal according to one or more exemplary embodiments of the present invention.

FIG. 1 is a block diagram showing a configuration of a mobile communication terminal used in one or more exemplary embodiments of the present invention. Referring to FIG. 1, the mobile communication terminal 10 includes a control unit 11, a key input unit 12, a storage unit 13, a display unit 14, a wireless communication unit 15, and a voice processing unit 16.

The control unit 11 controls general operations of the mobile communication terminal 10, and also controls the transmission and reception of messages.

The key input unit 12 provides a plurality of keys for the operation of the mobile communication terminal 10, generates key data corresponding to a user's key selection, and outputs the key data to the control unit 11. A message transmission menu or a message reception menu may be displayed according to a user command generated by the key input unit 12.

The storage unit 13 stores programs required for the operation and control of the mobile communication terminal 10 and data generated during execution of the programs. The storage unit 13 stores programs required for transmission and reception of messages and data including messages prepared during the execution of the programs. The message includes a short message and a multimedia message.

The display unit 14 of the mobile communication terminal 10 displays various menus for execution of the programs and data stored in the storage unit 13 as images on a screen. The display unit 14 displays multiple input windows including a message input window 14*a*, receiver address input window 14*b*, message receiving window 14*c*, and other windows required for transmission and reception of a message. A liquid crystal display (LCD) may be used as the display unit 14, but any type of display technology can be used.

The wireless communication unit 15 transmits and receives a message. The wireless communication unit 15 modulates a signal output by the control unit 11 and converts the frequency of the signal, and transmits a wireless signal through an antenna ANT. Additionally, the wireless communication unit 15 separates a reception signal from wireless signals received through the antenna ANT, converts the frequency of the signal and demodulates the signal, and outputs the signal to the control unit 11.

Still referring to FIG. 1, voice processing unit 16, under the control of the control unit 11, converts a voice signal input through a microphone MIC to a digital signal, demodulates voice data received from the wireless communication unit 15, and outputs the voice data through a speaker SPK.

A message, which is input using the message input window 14*a*, typically includes a plurality of unit messages, and the unit message is identified by an identification symbol. The identification symbol indicates the order of the unit message and the identification symbol may be selected from natural numbers and/or alphabetic characters. The message, which has been input using the message input window 14*a*, is stored in the storage unit 13 according to commands input by the transmitter.

The message may include a plurality of pages. In this case, the unit message consists of a page, and the identification symbol indicates a page number. When a mobile communication terminal operating in a global system for mobile communication (GSM) system is used, the message typically includes at most about 12 pages.

Alternatively, the message may not may contain a plurality of pages but rather comprises a plurality of sentences. In this case, the unit message comprises a sentence, and the identification symbol corresponds to the sequence number of a sentence in a sequential order of the sentences.

If an identification symbol and a receiver address are input using the receiver address input window 14*b*, the control unit 11 matches the receiver address to the identification symbol of a corresponding unit message. Subsequently, if the transmitter requests a message transmission through the key input unit 12, the control unit 11 transmits the unit message matched to the receiver address. A receiver may read the content of the message through the message receiving window 14*c* of a receiving terminal.

According to an exemplary embodiment of the present invention, the mobile communication terminal 10 enables transmission of a unit message selected by a transmitter from a plurality of unit messages to a desired receiver. Additionally, the transmitter may transmit different messages individually to a plurality of receivers, because each message to be transmitted to individual receivers may be prepared by combining the unit messages. Furthermore, according to the present invention the time required for a group transmission may be reduced by using the unit messages.

Figure 2:
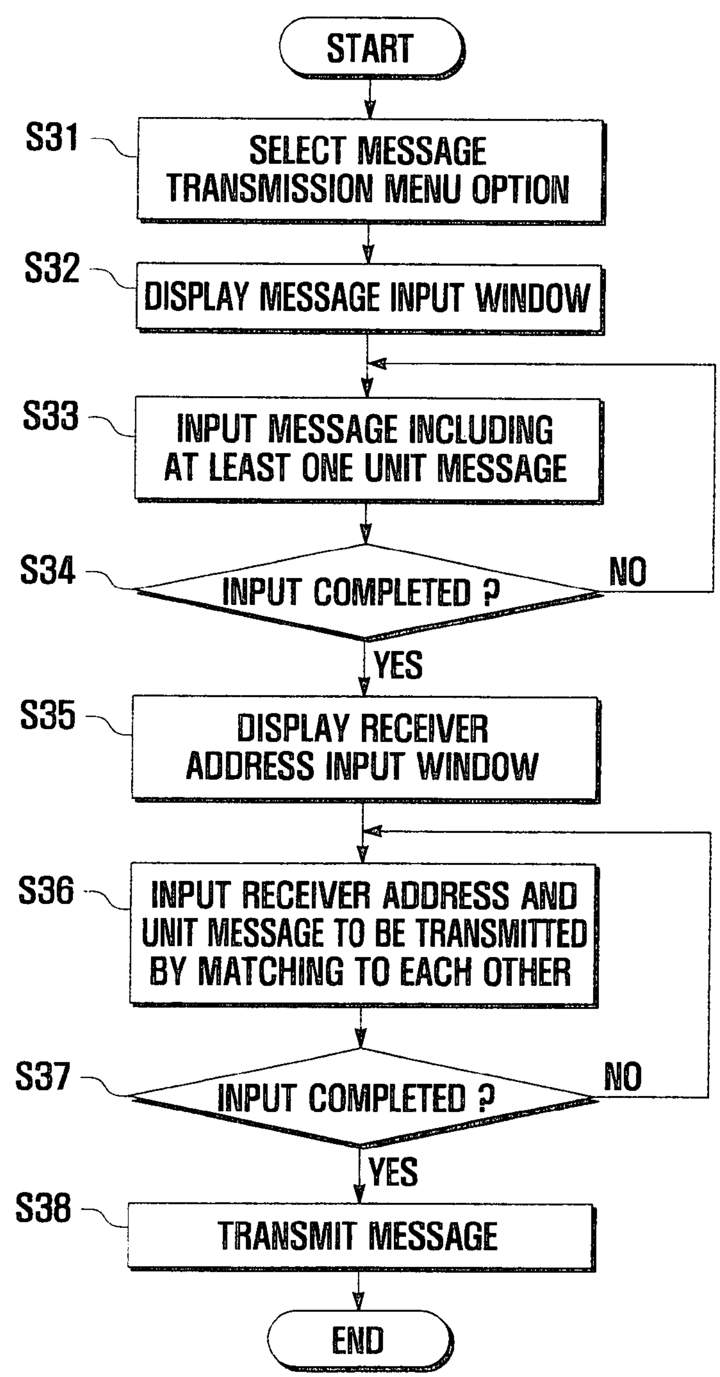
FIG. 2 is a flow chart showing a message transmission method for a mobile communication terminal according to a first exemplary embodiment of the present invention.
Figure 3:
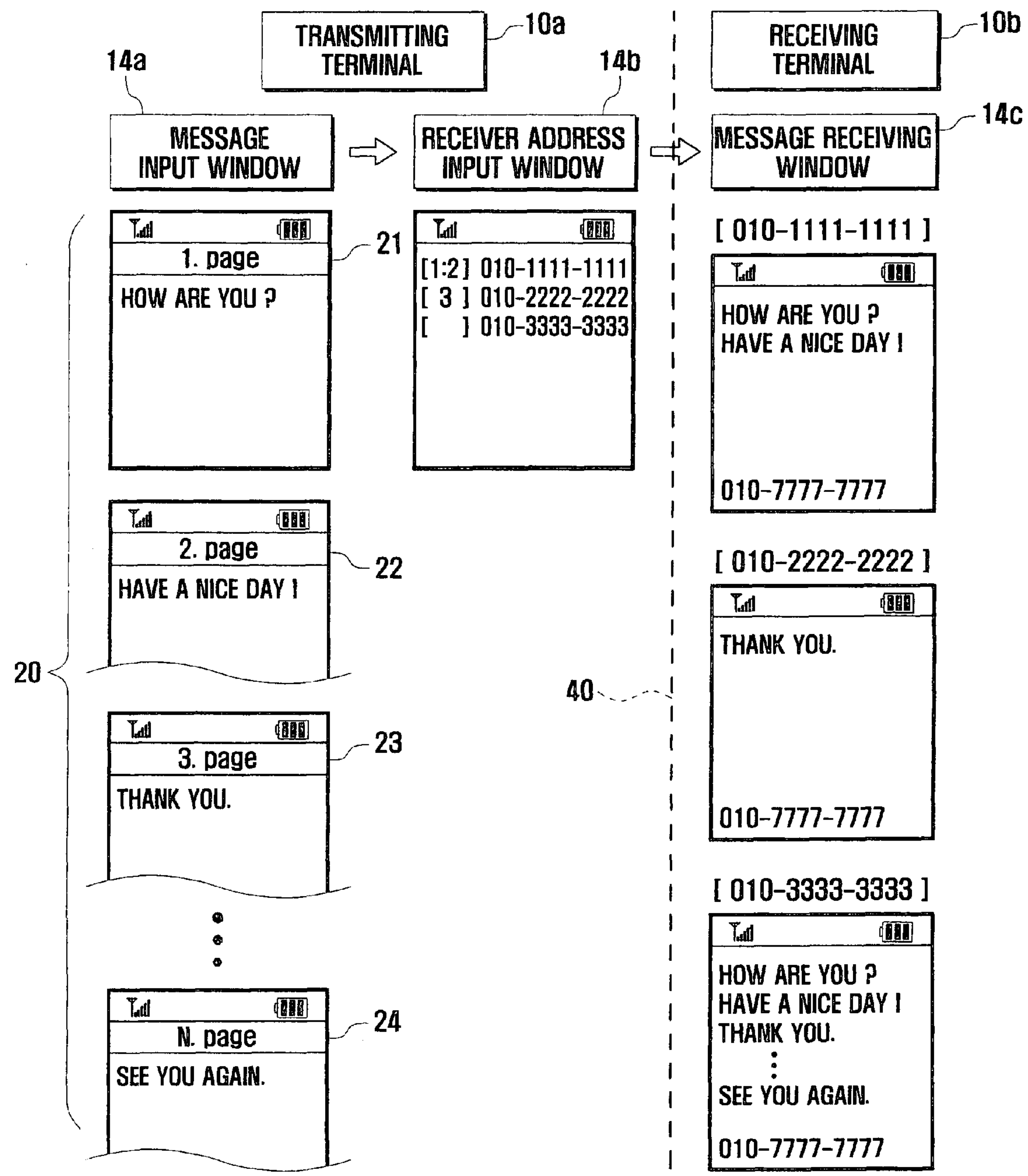
FIG. 3 provides examples of some screen displays of the message transmission method of FIG. 2.

FIG. 2 is a flow chart showing a message transmission method for a mobile communication terminal according to a first exemplary embodiment of the present invention. FIG. 3 shows examples of screen displays of the message transmission method of FIG. 2.

Referring to FIGS. 1 to 3, a transmitter first selects a message transmission menu option to transmit a message to a receiving terminal 10*b* by using a transmitting terminal 10*a* (S31, shown in FIG. 2), and a control unit 11 displays a message input window 14*a* on the screen of a display unit 14 (S32).

Subsequently, the transmitter inputs a message to be transmitted to the receiving terminal 10*b* through a key input unit 12 (S33). The message may include a plurality of unit messages.

After completing the message input, the transmitter inputs an input completion signal through the key input unit 12 (S34). The control unit 11 displays a receiver address input window 14*b* on the screen of the display unit 14 (S35). The receiver address input window 14*b* includes fields for inputting a receiver address and an identification symbol of a unit message.

The transmitter inputs a receiver address to which at least one unit message is to be transmitted and an identification symbol of each of the unit messages to be transmitted in the receiver address input window 14*b* by using the key input unit 12 (S36). The receiver address may be one of a receiver telephone number, e-mail address, and name.

After completing the receiver address input, the transmitter inputs an input completion signal through the key input unit 12 (S37). The control unit 11 then transmits the unit messages matched to each identification symbol to the receiver address through a mobile communication network (S38).

In the conventional message transmission method known heretofore, messages having different individual content cannot be transmitted to a plurality of receivers, because all unit messages included in a message are transmitted to the plurality of receivers. However, according to the exemplary embodiment of the present invention, messages having different content may be transmitted individually to a plurality of receivers by using unit messages.

As described herein above, the message may include a plurality of pages or a plurality of sentences. FIG. 3 shows examples of screen displays according to the message transmission method of FIG. 2. Referring to FIGS. 1 to 3, a message transmission method of using a plurality of pages is described as follows.

A message 20 input (shown in FIG. 3) through the message input window 14*a* may include N pages (N: natural number). In the case that a mobile communication terminal of a global system for mobile communication (GSM) system is used, the message 20 includes at most 12 pages (N=12). A person of ordinary skill in the art understands and appreciates that the page amount could change according to the standards for communication.

At step S33, the unit messages may be input through the message input window 14*a*. In the example, "How are you?", "Have a nice day!", "Thank you.", and "See you again." are input in the first page 21, second page 22, third page 23, and Nth page respectively.

In step S36, an identification symbol and a receiver address may be input through the receiver address input window 14*b*. More specifically, a page number is input as an identification symbol and a telephone number is input as a receiver address in the receiver address input window 14*b*. In the example shown in FIG. 3, an identification symbol "[1:2]" indicating the first page 21 and the second page 22, and a receiver address "010-1111-1111" are input in the receiver address input window 14*b*. Subsequently, an identification symbol "[3]" indicating the third page 23 and a receiver address "010-2222-2222" are input, and finally a receiver address "010-3333-3333" is input without an identification symbol. Here, inputting a receiver address without an identification symbol has the same effect as inputting all identification symbols.

In step S38, the transmitting terminal 10*a* transmits the unit messages matched to the receiver addresses to the corresponding receiving terminals 10*b* through a mobile communication network 40. That is, each message receiving window 14*c* of the receiving terminal 10*b* may display the selected unit messages and a transmitter address "010-7777-7777" (of transmitting terminal 10*a*) as follows.

In the message receiving window 14*c* of the receiving terminal 10*b* having the address "010-1111-1111", the contents of the first page 21 and the second page 22 corresponding to the identification symbol "[1:2]", and the transmitter address, are displayed. For example, the message includes the content "How are you? Have a nice day! 010-7777-7777".

In the message receiving window 14*c* of the receiving terminal 10*b* having the address "010-2222-2222", the contents of the third page 23 corresponding to the identification symbol "[3]", and the transmitter address, are displayed. That is, the message includes content "Thank you. 010-7777-7777".

In the message receiving window 14*c* of the receiving terminal 10*b* having the address "010-3333-3333", the complete contents of the message 20 and the transmitter address are displayed. That is, the message includes content "How are you? Have a nice day! Thank you. See you again. 010-7777-7777" Because no identification symbol was specified in the receiver address input window.

Although the aforementioned exemplary embodiment of the present invention discloses an example of displaying an identification symbol in a "[page number]" format in the receiver address input window 14*b*, the present invention is not limited thereto, and may utilize various types of display formats.

Figure 4:
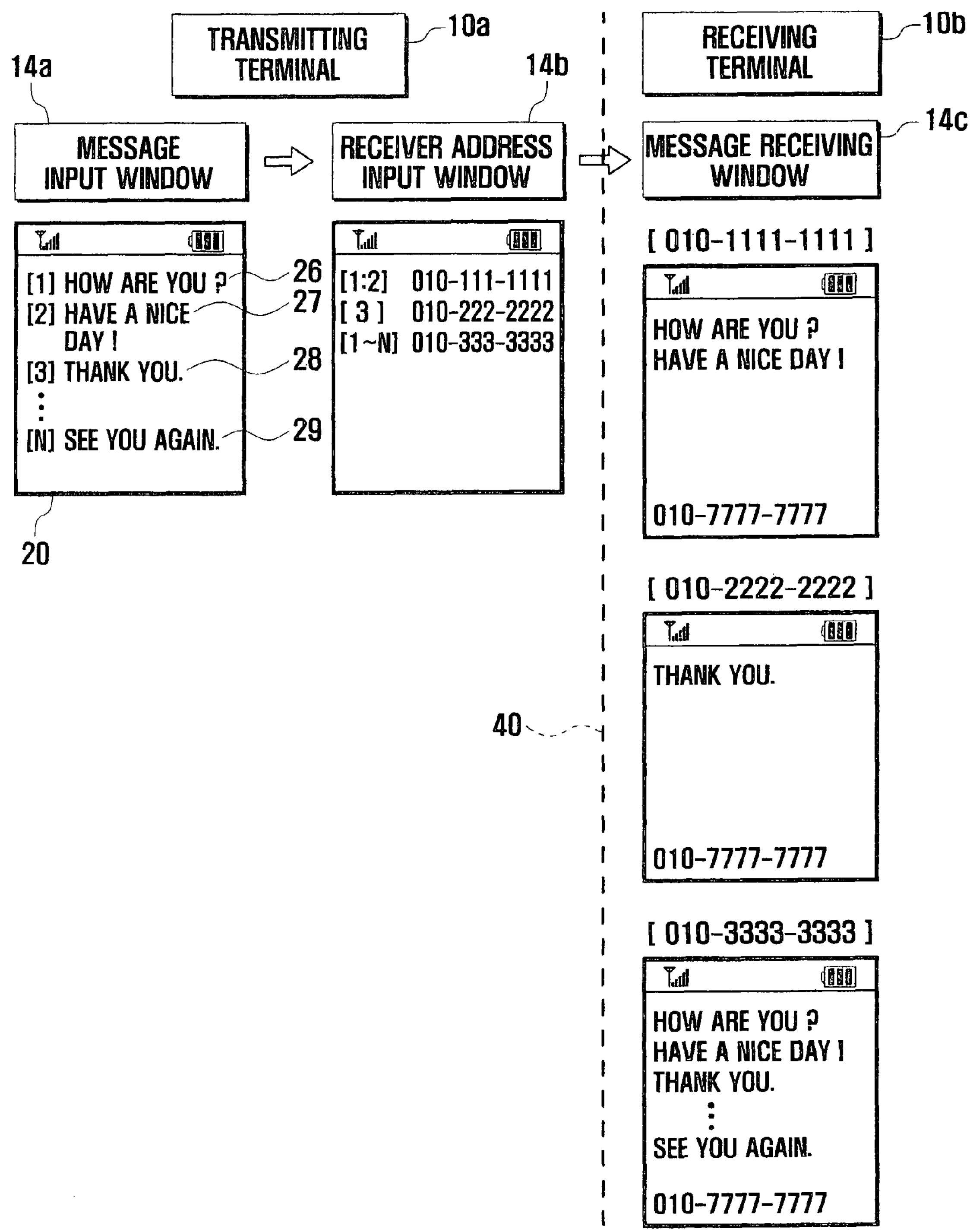
FIG. 4 provides additional examples of screen displays of the message transmission method of FIG. 2.

FIG. 4 shows additional examples of screen displays according to the message transmission method of FIG. 2. Referring to FIGS. 1, 2, and 4, a message transmission method that uses a plurality of sentences is described as follows.

In step S33, the transmitter inputs N sentences as the message 20 in the message input window 14*a* through the key input unit 12. Here, an identification symbol "[1]-[N]" indicates the order of sentences (reference numerals 26 to 29) input in the message input window 14*a*. In the example in FIG. 4, "How are you?", "Have a nice day!", "Thank you.", and "See you again." are input as the first sentence 26, second sentence 27, third sentence 28, and Nth sentence 29, respectively.

Although identification symbols are displayed in the front of the sentences 26 to 29 in part to assist in understanding the invention, the identification symbols may be not displayed at all or may be displayed in different forms than shown in FIG. 4.

Examples of displayed messages in the receiver address input window 14*b* and in the message receiving window 14*c* shown in FIG. 4 are identical to those of the previously illustrated examples, and hence are omitted.

Therefore, according to the first exemplary embodiment of the present invention, messages having different content may be transmitted individually to a plurality of receivers by using unit messages.

Figure 5:
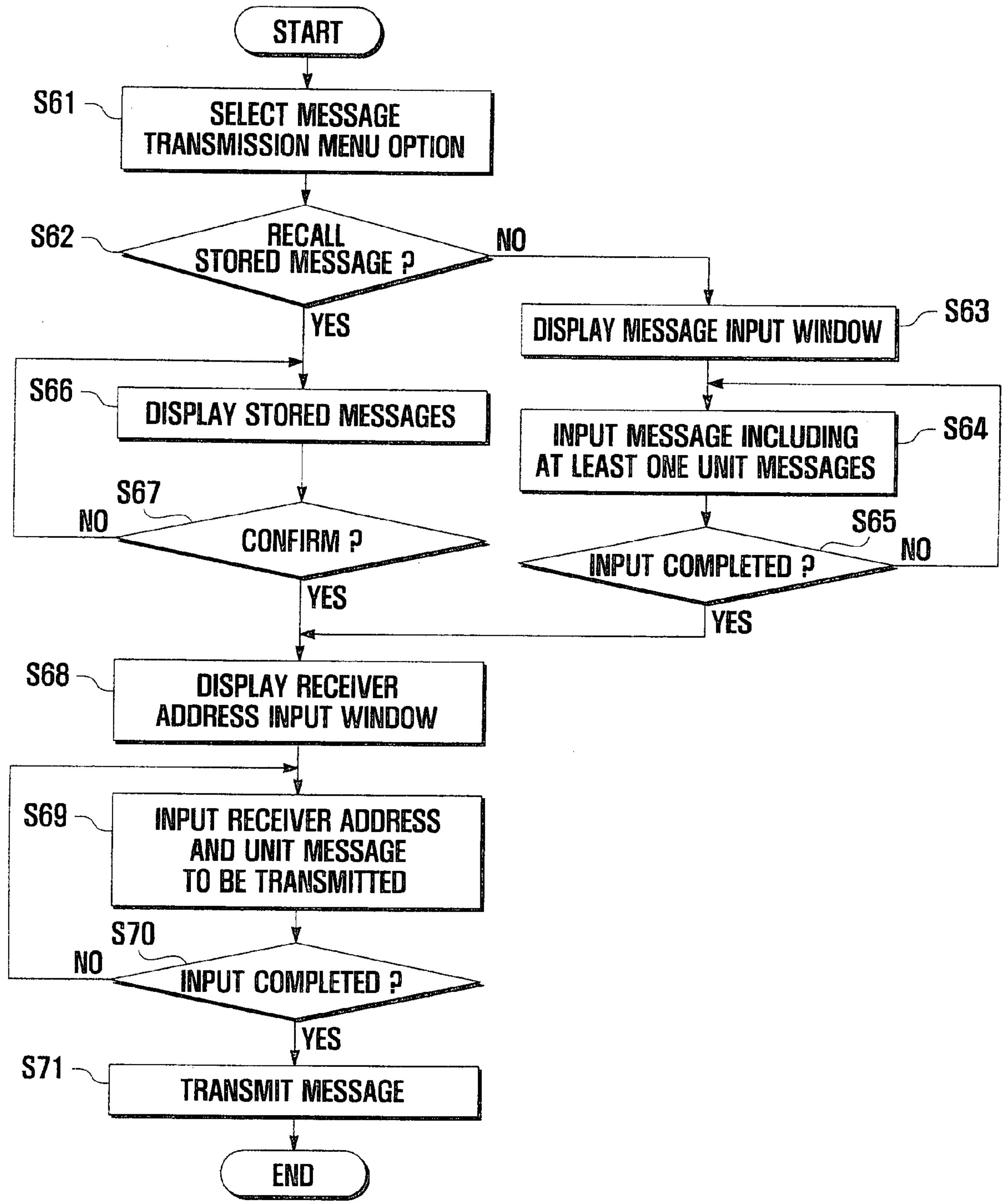
FIG. 5 is a flow chart showing a message transmission method for a mobile communication terminal according to a second exemplary embodiment of the present invention.

Although the message transmission method using the input of messages has been disclosed in the first exemplary embodiment, message transmission may also be performed by using unit messages stored in the storage unit of the transmitting terminal, as shown in FIG. 5.

FIG. 5 is a flow chart showing a method for message transmission for a mobile communication terminal according to a second exemplary embodiment of the present invention.

Referring to FIGS. 1 and 5, the transmitter selects a message transmission menu option through the key input unit 12 (S61), and the control unit 11 displays a window, on the screen of the display unit 14, asking whether to recall a unit message stored in the storage unit 13 (S62).

If a unit message recall is not selected, the control unit 11 then displays a message input window 14*a* on the screen of the display unit 14 (S63). Subsequently, steps S64 and S65 are executed in the same manner as steps S33 and S34 of FIG. 2. After input of the input completion signal at step S65, the control unit 11 displays a receiver address input window 14*b* on the screen of the display unit 14 (S68).

If a unit message recall is selected, the control unit 11 displays stored unit messages on the screen of the display unit 14 (S66). In the case that only one unit message is stored, content of the unit message is displayed on the screen of the display unit 14. In the case that a plurality of messages is stored, a list of unit messages is displayed, and the transmitter may provide for the display of a desired unit message by selecting a unit message with a key input.

After confirming the selection of stored unit messages (S67), the control unit displays the receiver address input window 14*b* at step S68. The subsequent steps S69 to S71 are executed in the same manner as steps S36 to S38 of FIG. 2.

According to the present invention, messages having different content may be transmitted individually to a plurality of receivers, because at least one unit message selected from a plurality of unit message is transmitted to a corresponding receiving terminal.

Additionally, according to the present invention, the time required for group transmission may be reduced by using unit messages in the transmission of different messages individually to a plurality of receivers.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

For example, although an example of matching a sentence to a unit message has been disclosed, a plurality of sentences may be matched to a unit message. Additionally, although an example of inputting a sentence as a unit message has been disclosed, a plurality of sentences may be input as a unit message. Also, there is no requirement that the sentence is a complete grammatically correct sentence, and a single character, or group of letters (such as "TTYL" short for "talk to you later") can be considered a sentence according to the present invention. It is also possible to have a phrase or sentence matched to a first unit message and a page or plurality of pages matched to a second unit message. Also, while in the exemplary embodiments above, the use of natural numbers or alphabetic characters are preferred, the invention is not limited thereto only those two types of identifiers.

What is claimed is:

1. A message transmission method for a mobile communication terminal, comprising:

inputting a message comprising a plurality of unit messages, each unit message having a different identification symbol;

inputting, when a receiver address input window displays, a plurality of receiver addresses and at least one identification symbol for each receiver address;

and transmitting each message composed of at least one unit message that corresponds to the at least one input identification symbol to corresponding mobile communication terminals, wherein the identification symbol of the unit message is selected from at least one of numbers and alphabetic characters indicating an order.

2. The message transmission method of claim 1, wherein the unit message comprises one page, the message comprises a plurality of pages, and the identification symbol corresponds to a page number.

3. The message transmission method of claim 1, wherein the unit message comprises a sentence, the message comprises a plurality of sentences, and the identification symbol corresponds to the sequence number of a sentence in a sequential order of sentences.

4. The message transmission method of claim 1, wherein the receiver address is one of a telephone number, e-mail address, and name.

5. A message transmission method for a mobile communication terminal, comprising:

displaying a message input window according to selection of a message transmission menu option;

inputting, in the message input window, a message comprising a plurality of unit messages, each unit message having a different identification symbol;

displaying, when the message input is complete, a receiver address input window;

inputting, in the receiver address input window, a plurality of receiver addresses and the identification symbols corresponding to at least one of the unit messages to be individually transmitted to mobile communications terminals having the corresponding receiver address; and transmitting the unit messages to the mobile communication terminals.

6. The message transmission method of claim 5, wherein the identification symbol of the unit message is selected from at least one of numbers and alphabetic characters indicating an order.

7. The message transmission method of claim 6, wherein the unit message comprises one page, the message includes a plurality of pages, and the identification symbol corresponds to a page number.

8. The message transmission method of claim 6, wherein the unit message comprises a sentence, the message includes a plurality of sentences, and the identification symbol corresponds to the sequence number of a sentence in a sequential order of sentences.

9. The message transmission method of claim 5, wherein the receiver address comprises one of a telephone number, e-mail address, and name.

10. The message transmission method of claim 5, wherein the receiver address is one of a telephone number, e-mail address, and name.

11. A message transmission method for a mobile communication terminal, the message comprising a plurality of unit messages, each unit message having a different identification symbol, comprising:

displaying a receiver address input window according to selection of a message transmission menu option;

inputting, in the receiver address input window, a plurality of receiver addresses and at least one identification symbol for each receiver address, the at least one identification symbol corresponding to at least one unit message to be individually transmitted to mobile communications terminals having corresponding receiver addresses; and transmitting the unit messages individually to mobile communication terminals individually having corresponding receiver addresses identified by the identification symbols, wherein the identification symbol of the unit message is selected from at least one of numbers and alphabetic characters indicating an order.

12. The message transmission method of claim 11, wherein the unit message is stored in the mobile communication terminal.

13. The message transmission method of claim 11, further comprising, before transmitting the input unit messages, confirming the selection of the input unit messages.

14. The message transmission method of claim 13, wherein the unit message comprises a sentence, the message comprises a plurality of sentences, and the identification symbol corresponds to the sequence number of a sentence in a sequential order of sentences.

* * * * *